March 18, 1952 — W. P. OZAROWSKI — 2,589,854
WINDSHIELD WIPER
Original Filed May 18, 1948
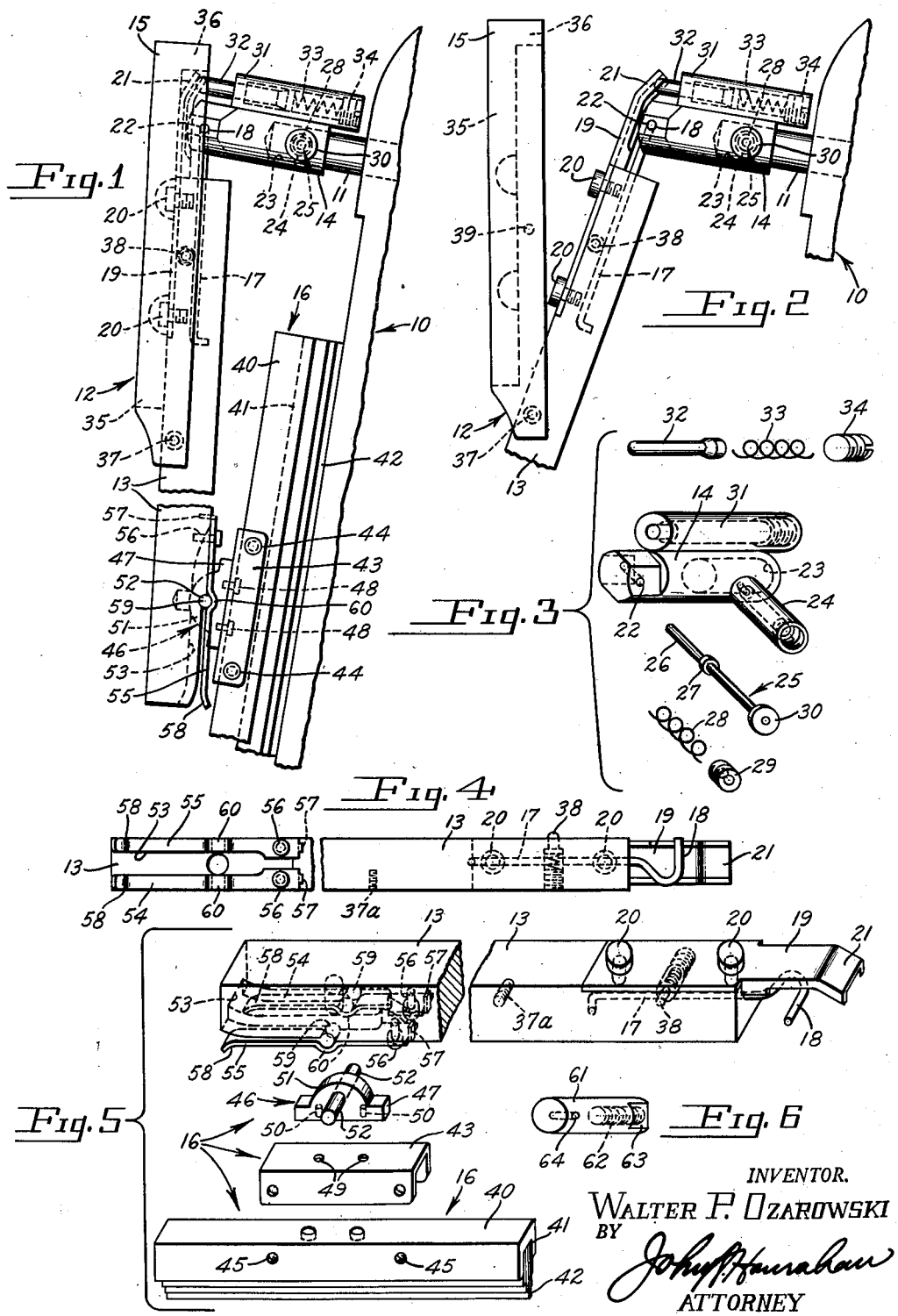
INVENTOR.
WALTER P. OZAROWSKI
BY
ATTORNEY Patented Mar. 18, 1952

2,589,854

UNITED STATES PATENT OFFICE 2,589,854

WINDSHIELD WIPER

Walter P. Ozarowski, Devon, Conn.

Original application May 18, 1948, Serial No. 27,802. Divided and this application April 27, 1949, Serial No. 89,901

7 Claims. (Cl. 15—255)

This invention relates to new and useful improvements in windshield wipers.

An object of the invention is to provide an improved but simple and inexpensive means whereby the wiper blade of a windshield wiper may be easily and conveniently mounted on or removed from the actuating arm of the wiper.

An additional object is to provide a windshield wiper blade including improved means for use in mounting such blade on the actuating arm of a windshield wiper.

Another object is to provide an improved wiper blade for a windshield wiper.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 1 is a side elevational view of the windshield wiper of the invention shown as mounted for the wiping of a windshield, but a portion of which is illustrated;

Fig. 2 is a similar view of the upper mounting portion of the wiper, the hood being in an open position;

Fig. 3 is an exploded view showing various parts of the wiper;

Fig. 4 is an elevational view of the inner side of the wiper arm;

Fig. 5 is an exploded view of the wiper blade structure and the wiper arm, the parts being in perspective; and Fig. 6 is an isometric view of an adapter employed when the drive shaft of the windshield wiper is threaded.

The present application is a division of my application Serial Number 27,802, filed May 18, 1948, now Patent Number 2,576,077, November 20, 1951.

Referring in detail to the drawing, at 10 is generally indicated a portion of a motor vehicle mounting the windshield (not shown) and a windshield wiper driving mechanism (not shown) the shaft 11 of the latter of which is oscillated when said mechanism is in use. My improved windshield wiper, generally designated 12, is mounted to be driven by the shaft 11 of any or the usual driving mechanism (not shown).

My improved wiper 12 includes an elongated blade driving arm 13, a coupling part 14 to which the arm 13 is connected and by which the arm 13 is given a pendulum-like movement, a hood 15 and a wiper blade generally designated 16. The arm 13 is preferably of a transparent synthetic resin or the like molded into the desired shape and rigid with said arm and extending beyond the upper end thereof is a rod 17. Where the arm 13 is of a molded plastic or the like, the rod 17 may be molded right into the arm but extends through the upper end of the latter and beyond the arm has its end portion bent to provide a portion 18 extending transversely or laterally or crosswise of the arm.

Mounted on the outer side of the upper portion of the arm 13 is a flat spring device 19 having its lower portion rigidly secured to the arm as by screws 20 and having its upper portion extending a considerable distance beyond the bent end 18 of the rod 17 and slightly offset or inclined inwardly as at 21. The bent end portion 18 of the rod 17 passes through an opening 22 extending transversely through the solid outer end portion of the coupling part 14. In this way, the arm 13 is mounted on the part 14 for pivotal movement relative thereto in one plane but is fixed to the part to impart pendulumlike movement to the arm 13 when the part 14 is oscillated due to its connection with the shaft 11, all as will appear.

When the bent end 18 of the rod is extended through the opening 22 in the coupling part, it is clear that the flat spring means 19 is extending across and above the outer end of said coupling part. Opening through the inner end of the coupling part 14 is a socket 23 of a diameter to conveniently receive the shaft 11. Extending laterally or radially from the inner portion of the coupling is a tubular means 24 through which extends a plunger 25 having an inner end portion 26 designed to extend transversely across the socket 23 and through a transverse hole in the received end portion of the shaft 11 whereby to key the part 14 to said shaft for oscillating movement with the latter.

Outwardly of the portion 26, the plunger 25 is provided with a collar 27 and a coil spring 28 surrounds the plunger outwardly of said collar 27 and at its inner end bears against the collar. A plug 29 threaded into the outer end of the extension 24 helps to centrally locate the plunger with respect to said tubular extension and provides a stop against which the outer end of the spring 28 engages. The tension of said spring will be regulated by threading the plug 29 more or less into the extension 24.

Preferably, the plunger includes an outer button-like head portion 30 for use in manually manipulating the plunger to withdraw its portion 26 from a position extending transversely of the socket 23 and through the mentioned opening in the shaft 11 whereby the windshield wiper may be removed from said shaft. Then to again mount the wiper on the shaft, the plunger is drawn outwardly and coupling 14 slipped over the shaft to align the inner end of the plunger with the mentioned hole through shaft 11 after which, on release of the plunger, spring 28 will function to shift the plunger inwardly to have it pass through the shaft and key the coupling to the latter.

On the upper side of the coupling part and, if desired, integral therewith is a barrel or tubular part 31 mounting a plunger 32 for movement through its outer end. Within said barrel is a coil spring 33 bearing at its forward end against the plunger and at its inner end against a plug 34 threaded into the inner end of the barrel. Clearly, the spring 33 constantly tends to keep the plunger projected through the forward end of the barrel and it will also be clear that the strength of the spring may be varied by adjusting the plug 34 more or less into the barrel.

At its forward end the plunger 32 bears against the inner side of the inwardly offset upper end portion 21 of the flat spring means 19. Thus, it will be understood that when the wiper is mounted on the shaft 11, the spring pressed plunger engaging the flat spring 19 tends to rock the driving arm 13 of the plunger about the pivotal connection, formed by the bent end 18 of the rod and the opening 22 of the coupling, in a direction to have the wiper blade 16 pressed against the windshield. The pressure of the blade on the windshield may be varied or adjusted by varying or adjusting the position of the plug 34 longitudinally of the barrel 31.

To cover and protect and partly conceal some of the above described mechanism, the hood 15 is provided. This hood is also preferably of a transparent plastic or resin and in transverse section is somewhat U-shaped whereby it is open at its inner side and includes opposite side walls and an outer wall 35 and an upper end wall 36. Hood 15 is pivotally mounted on the arm 13 as by a screw 37, the shank of which is threaded into a socket 37a in the arm. The hood is of a length and of a width so that in its closed position, as in Fig. 1, it receives the upper outer end portion of the arm 13 and the flat spring means 19, rod 17, a portion of the coupling 14 and of the plunger 32. Thus, these parts are concealed and are somewhat protected.

Additionally, since the hood in this position straddles the outer end portion of the coupling 14, lateral movement of the arm 13 with respect to the coupling, in the direction of the length of the bent end 18 of the rod 17, is prevented so that said rod portion may not move out of the opening 22 and the entire wiper arm and its parts are maintained operatively mounted on and connected with the coupling 14. The hood may be swung to an open position as suggested in Fig. 2 and at this time it will be seen that by moving arm 13 laterally in the direction of the length of the bent end 18 of the rod 17, such bent end may be withdrawn from the opening 22 and the wiper arm and its parts detached from the coupling part 14. This may be for repair or replacement of the removed wiper by another.

To maintain the hood in its closed position of Fig. 1, arm 13 is shown as mounting a spring pressed pin 38 which may engage in a dimple or recess 39 in the inner surface of a side wall of the hood when the latter is in a closed position. The described means is not intended as a lock but is merely intended as a means to prevent casual opening of the hood or casual movement of the hood to or toward the position of Fig. 2.

The wiper blade 16 comprises a back 40 of a stiff material. This back may be and preferably is formed of a suitable transparent plastic and, as shown, comprises an elongated body generally rectangular in transverse section and having a slot 41 opening through one longitudinal edge. A squeegee 42 is mounted in the channel 41 and extends outwardly therefrom and is also elongated and of substantially the length of the back 40. This squeegee, as shown, is made up of a number of flexible rubber strips of graduated widths with the strip of the greatest width comprising the center strip.

A bracket construction 43 comprising a channel member straddles the mid portion of the back 40 and is secured thereto as by means of screws 44 passing through the side walls of the saddle-like device and threaded into openings 45 in the back. Mounted on the outer or connecting wall of the bracket 43 is a mounting means generally designated 46 and comprising a block-like body 47 which rests against said outer wall of the bracket and is secured thereto as by screws 48 passing through openings 49 in the outer wall of the bracket and threaded into sockets 50 in the block.

Outwardly or above the block or body 47, the means 46 includes an arcuate portion 51 having flat sides from which project studs or journal elements 52. Such studs or journal elements 52 are in alignment and may comprise portions of the same rod or bar or may be separate pieces suitably anchored. From the above, it will be seen that the assembled blade 16 comprises the back 40 carrying the squeegee and the bracket 43 secured to the back and in turn mounting the means 46.

In its inner side, toward its lower end, the drive bar 13 is provided with a slot 53 which opens through the lower end of the bar. Disposed on the lands or bar portions at each side of said slot are spring fingers 54 and 55. These fingers are secured in place as by screws 56 passing through the upper end portions of the fingers and preferably the fingers also have their extreme upper end portions bent upon themselves and imbedded in the stock of the bar 13, as at 57.

The fingers are of spring stock and clearly their portions below the screws 56 may flex with respect to the bar 13. The lower ends or the free ends of the fingers are preferably bent outwardly as at 58. The above described lands or the bar portions at the respective sides of the slot 53 are intermediate their ends provided with arcuate depressions or recesses 59 and opposite such depressions or recesses, the fingers 54 and 55 are outwardly offset, also in arcuate form, as at 60.

To assemble the wiper blade 16 on the arm 13, the studs or journals 52 are brought under the outturned ends 58 of the fingers 54 and 55 with the arcuate portion 51 of the means 46 aligned with the open end of the slot or groove or channel 53. Then by relative longitudinal movement of the wiper and the bar 13 toward one another, the studs or journals 52 are carried under the spring fingers 54 and 55 and snap into the recesses 59 with their outer sides engaged by the offset portions 60 of the fingers. In this way, the wiper is secured to the bar 13 so as not to casually separate from the latter. However, the wiper may have a rocking movement on the journals or studs 52. Nevertheless, with the flat sided arcuate portion 51 of the means 46 between the flat sides of the groove or channel 53, lateral movement of the wiper blade relative to the arm 13 is impossible.

Therefore, it will be clear that as the arm 13 is swung back and forth in a pendulum-like movement, on oscillation of the coupling 14, a similar movement will be imparted to the wiper blade 16. The spring pressed plunger 32 bearing against the inwardly offset end portion of the flat spring member 19, there is a tendency for the wiper arm 13 to rock on its pivotal connection with the coupling 14 whereby to thrust the squeegee 42 of the wiper blade against the windshield.

The described pivotal connection between the arm and the coupling is the result of the offset end portion 18 of the bar 17 passing through the opening 22 in the outer end portion of the coupling. When the wiper blade 16 is no longer fully useful, it may be detached from the arm 13 by a downward pull on the wiper blade or by pressure on the blade in the direction of its length. This forces the studs or pins 52 outwardly beneath the fingers 54 and 55 with the arcuate portion 51 of the means 46 passing downwardly through the groove or channel 53. Thus, it will be seen that the wiper blade is easily mounted on the arm 13 and is easily removed therefrom for replacement or the like.

Where the windshield wiper motor or motive means has a threaded shaft of smaller diameter than the shaft 11, or of any other diameter, an adaptor is threaded onto said shaft and then the coupling 14 mounted on said adaptor. Such an adaptor is shown in Fig. 6 and the same comprises a transversely circular bar portion 61 having a threaded socket 62 opening through one end to be threaded onto a threaded drive shaft. This body 61 may be provided with flats 63 to be engaged by a suitable wrench or the like for tightening the coupling on the drive shaft. Intermediate its ends, adaptor or body 61 is provided with a transverse opening 64 through which the locking portion 26 of the spring pressed plunger 25 may pass for keying the coupling 14 to the adaptor after the latter has been threaded onto a drive shaft.

Having thus set forth the nature of my invention, what I claim is:

1. In a windshield wiper, a blade driving arm, said arm having a channel opening through one side and an end thereof, a pair of spring fingers fastened to said arm and extending one at each side of said channel and along the land portions of the arm at each side of said channel, said arm having aligned recess portions through said lands at the respective sides of the channel, a wiper blade having a flat-sided block on its outer side of a width to be received in said channel, a journal element extending from each side of said block and adapted to be received in said recesses, and said wiper blade adapted to be mounted on said arm by inserting said journal elements under said spring fingers and aligning the block with said channel and then causing relative movement of the arm and wiper in the direction of the length of the arm to carry said elements under said fingers and into alignment with said recesses whereupon said fingers press said elements into said recesses whereby the elements and the recesses mount the blade for rocking movement on an axis transverse to the longitudinal axis of the arm and said block being located in said channel prevents substantial relative lateral movement between the blade and arm.

2. In a windshield wiper, a wiper blade comprising an elongated stiff back portion having a longitudinal channel opening through an edge, squeegee means mounted in said channel and extending beyond the same, a U-shaped bracket straddling and mounted on the mid portion of said back and having its connecting portion against and extending across the edge thereof opposite that through which said channel opens and having its arms embracing the sides of said back, means securing said arms to said back at points spaced longitudinally of the back whereby said bracket is fixed to the back against movement relative thereto, a rigid mounting means on the connecting portion of said bracket and including a block secured against said portion and an outwardly projecting flat sided portion on said block, said portion arcuate on its outer edge, and a journal means rigid with said portion and comprising journal elements extending from each side of said flat sided portion.

3. In a windshield wiper, a wiper blade comprising an elongated stiff back portion of a transparent material having a longitudinal channel opening through an edge, squeegee means mounted in said channel and extending beyond the same, a U-shaped bracket mounted on the mid portion of said back and having its connecting portion against and extending across the edge thereof opposite that through which said channel opens and having its arms embracing the sides of said back, means securing said arms to said back at points spaced longitudinally of the back whereby said bracket is fixed to the back against movement relative thereto, a rigid mounting means on the connecting portion of said bracket and including a block rigidly secured against said portion and an outwardly projecting flat sided portion rigid with said block, said portion arcuate on its outer edge, and a journal means rigid with said portion and comprising journal elements extending from each side of said flat sided portion.

4. In a windshield wiper, a blade driving arm, said arm having a channel opening through one side and an end thereof, said arm having aligned recess portions through the land portions of the arm at each side of said channel, a wiper blade having a flat side block on its outer side of a width to be received in said channel, journals extending from opposite sides of said block and adapted to be received in said recesses, said wiper blade adapted to be mounted on said arm by aligning the block with said channel and then causing relative movement of the arm and wiper in the direction of the length of the arm to carry said journal elements into alignment with said recesses, and means on said arms to then press said elements into said recesses whereby the elements and recesses mount the blade for rocking movement on an axis transverse to the longitudinal axis of the arm and said block being located in said channel prevents substantial relative lateral movement between the blade and arm.

5. In a windshield wiper, a blade driving arm member, a wiper blade member including a stiff back, cooperating means on said blade back and said arm for detachably mounting the blade on the arm, said cooperating means including journal elements on one of said members and recesses in the other member to receive said journal elements, said journal elements extending transversely of said back and intermediate the ends thereof, and spring means on one of said members and bearing against said journal elements and maintaining said cooperating means in cooperative relation while permitting said blade member to be mounted on and dismounted from said arm member by relative longitudinal movements of said members.

6. In a windshield wiper, a blade driving arm member, a wiper blade member including a stiff back, cooperating means on said blade back and said arm for detachably mounting the blade on the arm, said cooperating means including journal elements on one of said members and recesses in the other member to receive said journal elements, said journal elements extending transversely of said back intermediate the ends thereof, spring means on one of said members and bearing against said journal elements and maintaining said cooperating means in cooperative relation, said spring means including elongated spring arms under which said journal elements are passed to enter said recesses and by which said journal elements are yieldingly held in said recesses, and said spring arms permitting of mounting of said blade member on and dismounting of the same from said arm member by relative longitudinal movements of said members.

7. In a windshield wiper blade, an elongated stiff back portion having a longitudinal channel opening through an edge, squeegee means mounted in said channel and extending beyond the same, a U-shaped bracket straddling and mounted on said back, said bracket having its arms engaging the sides of said back and its connecting portion against the edge of the back opposite that through which said channel opens, a block on the outer side of the connecting portion of said bracket, screws passing through the connecting portion of said bracket and into said block and securing said parts together, spaced means rigidly securing the arms of said bracket against the sides of said back, an outwardly projecting flat sided portion on said block, said portion arcuate on its outer edge, and aligned journal elements projecting from the flat sides of said flat sided portion for use in mounting said blade on a wiper arm.

WALTER P. OZAROWSKI.

REFERENCES CITED

The following references are of record in the file of this patent:

UNITED STATES PATENTS

| Number | Name | Date |
| --- | --- | --- |
| 2,196,542 | Zaiger | Apr. 9, 1940 |
| 2,234,709 | Rodrick | Mar. 11, 1941 |
| 2,270,589 | Hansen | Jan. 20, 1942 |

FOREIGN PATENTS

| Number | Country | Date |
| --- | --- | --- |
| 489,352 | Great Britain | Aug. 25, 1938 |